United States Patent
Hwang et al.

(10) Patent No.: US 8,330,798 B2
(45) Date of Patent: Dec. 11, 2012

(54) APPARATUS AND METHOD FOR PROVIDING STEREOSCOPIC THREE-DIMENSIONAL IMAGE/VIDEO CONTENTS ON TERMINAL BASED ON LIGHTWEIGHT APPLICATION SCENE REPRESENTATION

(75) Inventors: Seo-Young Hwang, Suwon-si (KR); Jae-Yeon Song, Seoul (KR); Gun-Ill Lee, Seoul (KR); Kook-Heui Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 873 days.

(21) Appl. No.: 12/250,968

(22) Filed: Oct. 14, 2008

(65) Prior Publication Data
US 2009/0096864 A1    Apr. 16, 2009

(30) Foreign Application Priority Data
Oct. 13, 2007  (KR) .............................. 2007-103295

(51) Int. Cl.
 H04N 13/00    (2006.01)
(52) U.S. Cl. .......................................... 348/42; 348/43
(58) Field of Classification Search .................... 348/42, 348/43
See application file for complete search history.

(56) References Cited

U.S. PATENT DOCUMENTS

2005/0259147 A1 * 11/2005 Nam et al. ...................... 348/43
2010/0161686 A1    6/2010 Yun et al.

FOREIGN PATENT DOCUMENTS

| EP | 944269 B1 * | 11/2002 |
|---|---|---|
| JP | 2000-78611 A | 3/2000 |
| JP | 2005-533433 A | 11/2005 |
| JP | 2008-537830 A | 9/2008 |
| JP | 2010-530702 A | 9/2010 |
| KR | 10-2001-0104493 A | 11/2001 |
| KR | 10-2007-0041284 A | 4/2007 |
| WO | 2006/109978 A1 | 10/2006 |
| WO | 2007/061184 A1 | 5/2007 |

OTHER PUBLICATIONS

Jean-Claude Dufourd et al., LASeR: the MPEG Standard for Rich Media Services, IEEE MultiMedia, Dec. 21, 2006.*
Jean-Claude Dufourd et al., An MPEG Standard for Rich Media Services, IEEE MultiMedia, Oct.-Dec. 2005, pp. 60 and 62, figures 2-3.

(Continued)

*Primary Examiner* — Joon H Hwang
*Assistant Examiner* — Jaren M Means
(74) *Attorney, Agent, or Firm* — Jefferson IP Law, LLP

(57) ABSTRACT

A method for providing stereoscopic three-dimensional (3D) image/video content in a terminal based on Lightweight Application Scene Representation (LASeR) is provided. The method includes receiving a LASeR content including therein stereoscopic 3D image/video information, decoding the received LASeR content according to a stereoscopic 3D image/video attribute, checking LASeR commands from the decoded LASeR content, carrying out the LASeR commands, parsing scene information including stereoscopic 3D image/video information included in the decoded LASeR content, determining whether a media object to be included in scene description is a stereoscopic 3D image/video according to the stereoscopic 3D image/video information and, when the media object to be included in scene description is a stereoscopic 3D image/video, displaying the stereoscopic 3D image/video according to whether the terminal supports a stereoscopic 3D image/video.

32 Claims, 12 Drawing Sheets

OTHER PUBLICATIONS

Chun et al., Proposal for Technical Specification of Stereoscopic MAF, International Organization for Standardization, Jun. 27, 2007.
Revised Requirement for Stereoscope MAF, Information Technology—Coding of Audio-Visual Objects—Part 20: Lightweight Application Scene Representation (LASeR) and Simple Aggregation Format (SAF), Jun. 27, 2007.
ISO/IEC FDIS 14496-20 2nd Edition, Information Technology—Coding of Audio-Visual Objects—Part 20: Lightweight Application Scene Representation (LASeR) and Simple Aggregation Format (SAF), Jul. 6, 2007.
Cha et al., Study Text of ISO/IEC CD 23000-8 Portable Video Player MAF, International Organization for Standardization, Jul. 13, 2007.
Ko et al., A Viewpoint Switching Method for Multiview Videos Using the MPEG-4 System, Sixth International Conference on Advanced Language Processing and Web Information Technology, Aug. 22, 2007.
Kim et al., Text of ISO/IEC CD 23000-11 for Stereoscopic Video Application Format, International Organization for Standardization, Jan. 25, 2008.

* cited by examiner

APPARATUS AND METHOD FOR PROVIDING STEREOSCOPIC THREE-DIMENSIONAL IMAGE/VIDEO CONTENTS ON TERMINAL BASED ON LIGHTWEIGHT APPLICATION SCENE REPRESENTATION

PRIORITY

This application claims the benefit under 35 U.S.C. §119(a) of a Korean patent application filed in the Korean Intellectual Property Office on Oct. 13, 2007 and assigned Serial No. 2007-103295, the entire disclosure of which is hereby incorporated by reference.

BACKGROUND OF THE INVENTION

1. Field of the Invention

The present invention relates generally to display of three-dimensional (3D) image/video. More particularly, the present invention relates to an apparatus and method for displaying a stereoscopic 3D image/video based on Lightweight Application Scene Representation (LASeR).

2. Description of the Related Art

Various technologies are now under consideration for providing multimedia services. In particular, one technology that provides temporal, spatial configuration and representation of elements of multimedia content is the Moving Picture Experts Group (MPEG)-4 Lightweight Application Scene Representation (LASeR). LASeR is a multimedia content format that allows users to enjoy multimedia services in a communication environment in which available resources are insufficient, for example in the mobile terminal environment. More specifically, LASeR is a technology proposed for free representation of various multimedia and interaction with users, using such data as scene description, video, audio, image, font, text, metadata and script. The LASeR data is composed of an Access Unit (AU) that includes at least one command, wherein the command is used for changing a scene property at a particular time. The commands, which should be simultaneously executed, are included in one AU as one bundle. The AU can be one scene, sound, or short animation. Currently, LASeR is under standardization for convergence with the World Wide Web Consortium (W3C) and uses the Scalable Vector Graphics (SVG) and Synchronized Multimedia Integration Language (SMIL) standards of W3C. Using SVG allows for displaying the same picture quality regardless of the type of screen or resolution since it represents (expresses) scenes in a mathematical manner. Also, effective representation of scenes is possible with low data capacity since it is based on text. SMIL defines and shows a temporal, spatial relation of multimedia data. The use of SVG and SMIL can represent audio, video, text, image, video, polyhedron, etc.

FIG. 1 is a diagram illustrating an operation of a terminal that received LASeR content according to the conventional art. Herein, the term "LASeR content" refers to the resource elements displayed in a scene actually being serviced in the terminal, including media such as video and audio. Referring to FIG. 1, the terminal receives a LASeR service in step 100. The terminal decodes LASeR content of the received LASeR service in step 110. In step 120, the terminal checks LASeR commands from the decoded LASeR content and executes the LASeR commands. The terminal processes all events of the LASeR content in step 130, and determines in step 140 active a media object according to time information of the media object. Finally, in step 150, the terminal renders and displays scene components, including media such as video and audio. The operation of the terminal that received the LASeR content follows the Execution Model of the ISO/IEC 14496-20 MPEG-4 LASeR standard document, the entire disclosure of which is hereby incorporated by reference. The above-described LASeR content can be represented in the syntax of Table 1 using a LASeR language. According to Table 1, the terminal configures (describes) and displays scenes (<svg> . . . </svg>) included in a corresponding LASeR command every time the LASeR command (<NewScene>) is executed.

TABLE 1

```
<NewScene>
    <svg width="480" height="360" viewBox="0 0 480 360">
    ...
    </svg>
</NewScene>
```

With regard to recent image/video technology, intensive research is being conducted on a scheme of realizing three-dimensional (3D) image/video that provides a more-realistic image/video presentation. One method for realizing 3D image/video is to extract a 3D object from several cuts of an image/video at various angles using several cameras. However, this is a complex method that requires correspondingly complex calculations. Therefore, many attempts are being made on a method for projecting the left-visual point image/video and the right-visual point image/video to their corresponding positions on the existing display device to exploit the human eye's visual perception characteristic. That is, the left- and right-visual point image/videos are projected to their corresponding positions and then the left visual point and the right visual point are separately imaged on the left eye and the right eye of the user, thereby providing a stereoscopic effect. The 3D image/video made using the inter-eye visual difference method is called 'stereoscopic 3D image/video'.

As interest in 3D image/video increases, portable terminals having a Barrier Liquid Crystal Display (LCD) that can reproduce stereoscopic content and provide more-realistic image/video to the user are being advanced. In particular, since the method for reproducing stereoscopic content can represent rich scenes while requiring less data capacity by using various elements, many service providers intend to select and provide LASeR as a scene representation tool.

A stereoscopic video stream should contain the left and right image/video data together and is therefore different from a normal video stream such as the video stream illustrated in FIG. 2A. Referring to FIG. 2A, it can be noted that the normal video stream is composed of one stream in which a plurality of image/video frames are concatenated.

FIGS. 2B to 2E are diagrams illustrating conventional stereoscopic video streams. The stereoscopic video stream of FIG. 2B is composed of one video stream in which the left and right images/videos are contained in one frame together. The stereoscopic video stream of FIG. 2C is composed of one video stream in which the left and right images/videos are contained in one frame line by line in an interleaving manner. The stereoscopic video stream of FIG. 2D is composed of one video stream in which the left and right image/video frames alternately occur, and the stereoscopic video stream of FIG. 2E is composed of independent left and right image/video streams.

As illustrated in FIGS. 2B to 2E, in the stereoscopic 3D image/video video stream, unlike in the conventional video stream, even though the left and right images/videos are configured in two video streams or one video stream, the left and right images/videos are separately configured in their associated frames, or configured in one frame in a mixed manner.

Regarding the stereoscopic 3D image/video, both the left and right images/videos are mixed and displayed as a single 3D image/video according to the LCD Barrier type of display. However, since the existing LASeR-based terminal recognizes and displays only one video stream for one media element, in the case where it is desired to display the stereoscopic 3D image/video, if two or more video streams are delivered, as shown by reference numeral 210 of FIG. 2E, it is not possible to identify the video stream that should be displayed. Otherwise, as the terminal displays only one recognizable video stream among the two or more video streams, it cannot display 3D image/video. In addition, even if the left and right images/videos are delivered on one video stream as shown in FIGS. 2B to 2D, they are not displayed as 3D images/videos made by mixing both the left and right images/videos as shown by reference numeral 200 of FIG. 2D. Rather, a normal image/video is displayed in which the left and right images/videos alternately occur. Such display is likely to make the user feel fatigued. Further, in the case of FIG. 2B, since the user should view almost the same left and right images/videos separately on one screen, the size of videos is unnecessarily reduced from the viewpoint of the user, and the user is also apt to feeling fatigued. Even in the case of FIG. 2C, the distorted images/videos are viewed, causing the same problems as the other examples. Therefore, when there is an intention to provide stereoscopic 3D image/video, there is a demand for a method and apparatus for providing stereoscopic 3D image/video on a LASeR-based terminal.

In addition, there is a demand for a function capable of parsing information on stereoscopic 3D image/video and delivering the optimized image/video to a LASeR engine regardless of whether it supports stereoscopic 3D image/video of a LASeR engine mounted in the terminal.

SUMMARY OF THE INVENTION

An aspect of the present invention is to address at least the above-mentioned problems and/or disadvantages and to provide at least the advantages described below. Accordingly, an aspect of the present invention is to provide an apparatus and method for providing stereoscopic 3D image/video content on a LASeR-based terminal in a LASeR service.

Another aspect of the present invention is to provide a stereoscopic 3D image/video content providing apparatus and method in which a receiving terminal incapable of processing stereoscopic 3D image/video content can control the corresponding content and service the optimized content.

According to one aspect of the present invention, a method for providing stereoscopic three-dimensional (3D) image/video content based on Lightweight Application Scene Representation (LASeR) is provided. The method includes generating a LASeR content including therein stereoscopic 3D image/video information according to a stereoscopic 3D image/video attribute, encoding the generated LASeR content and transmitting the encoded LASeR content to a terminal.

According to another aspect of the present invention, a method for providing stereoscopic three-dimensional (3D) image/video content in a terminal based on Lightweight Application Scene Representation (LASeR) is provided. The method includes receiving a LASeR content including therein stereoscopic 3D image/video information, decoding the received LASeR content according to a stereoscopic 3D image/video attribute, checking LASeR commands from the decoded LASeR content, executing the LASeR commands, parsing scene information including stereoscopic 3D image/video information included in the decoded LASeR content, determining active media object to be included in scene description comprises a stereoscopic 3D image/video according to the stereoscopic 3D image/video information and, when the media object to be included in scene description comprises a stereoscopic 3D image/video, displaying the stereoscopic 3D image/video according to whether the terminal supports a stereoscopic 3D image/video.

According to further another aspect of the present invention, an apparatus for providing stereoscopic three-dimensional (3D) image/video content based on Lightweight Application Scene Representation (LASeR) in a transmitter of a communication network is provided. The apparatus includes a LASeR content generator for generating a LASeR content including therein stereoscopic 3D image/video information according to a stereoscopic 3D image/video attribute; a LASeR encoder for LASeR-encoding the generated LASeR content; and a LASeR content transmitter for transmitting the encoded LASeR content to a terminal.

According to yet another aspect of the present invention, an apparatus for providing stereoscopic three-dimensional (3D) image/video content in a terminal based on Lightweight Application Scene Representation (LASeR) is provided. The apparatus includes an Audio/Video (AV) processor for processing stereoscopic 3D image/video data, a LASeR decoder for decoding LASeR data, a LASeR scene tree manager for checking stereoscopic 3D image/video information from the decoded LASeR data according to a stereoscopic 3D image/video attribute and for controlling scene description for describing a LASeR scene according to the stereoscopic 3D image/video information, a LASeR renderer for generating LASeR data according to LASeR scene description information provided from the LASeR scene tree manager and a display for displaying the stereoscopic 3D image/video data provided from the AV processor, as a part of the LASeR scene that the LASeR renderer renders according to the LASeR scene description information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Terms used herein are defined based on functions in the present invention and may vary according to users or operators' intention or usual practices. Therefore, the definition of the terms should be made based on contents throughout the specification.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and method for providing stereoscopic 3D image/video content on a LASeR-based terminal, in which scene description information including stereoscopic 3D image/video is transmitted such that a terminal can receive the scene description information and display the optimized stereoscopic 3D image/video.

Further, exemplary embodiments of the present invention provide an apparatus and method for providing stereoscopic 3D image/video content on a LASeR-based terminal, wherein the apparatus and method controls stereoscopic 3D image/video content regardless of whether it supports stereoscopic 3D image/video of a terminal receiving the stereoscopic 3D image/video.

A description of exemplary embodiments of the present invention will be made herein with reference to a terminal based on a LASeR engine, which is a type of Rich Media Engine (RME), and the same can be applied even to other RME-based terminals. However, when there is a change in the RME or system applied to the terminal, there is a need for a change in the engine to the names uniquely used in the RME or system other than the LASeR engine. Because this is considered obvious to those skilled in the art, it will not be further explained herein.

Although exemplary embodiments of the present invention deal with stereoscopic 3D image/video for which both the left and right images/videos are used by the inter-eye visual difference method, exemplary embodiments of the present invention can be extended and applied even to the 3D image/video made by various methods of extracting a 3D object from several cuts of image/video at various angles using several cameras.

Figure 3:
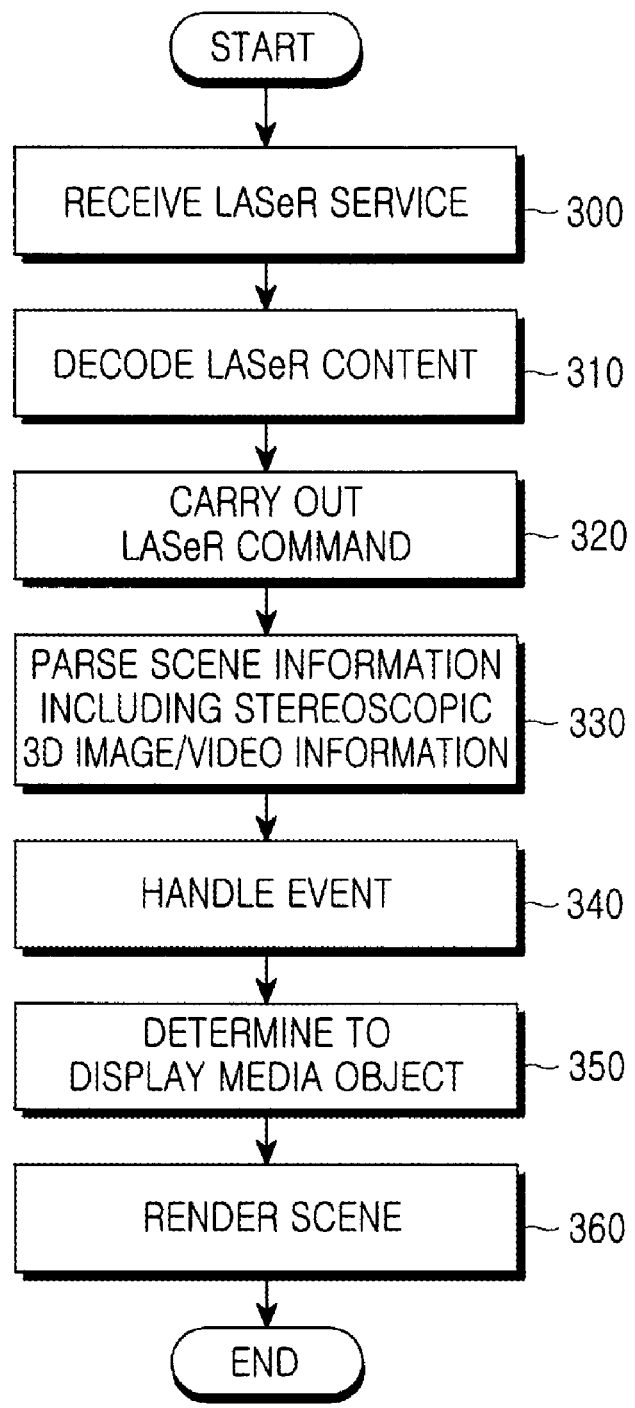
FIG. 3 is a control flow diagram for processing a LASeR data stream including information on stereoscopic 3D image/video that a LASeR engine received according to a first exemplary embodiment of the present invention.

FIG. 3 is a control flow diagram illustrating a method of processing a LASeR data stream that includes information on stereoscopic 3D image/video received by a LASeR engine according to a first exemplary embodiment of the present invention. In this process, a LASeR engine of a receiving terminal, that processes a command and a LASeR scene description, controls and processes a LASeR data stream that includes stereoscopic 3D image/video information received by the terminal. The term "LASeR data stream" refers to scene description data of the content constructed with the pure LASeR language included in the LASeR content. With reference to FIG. 3, a description will now be made of an apparatus and method for defining new elements and attributes including information on stereoscopic 3D image/video according to a first exemplary embodiment of the present invention. In the following description, the term "element" refers to a basic unit of entities constituting the scene, and the term "attribute" refers to a property of elements constituting the scene.

Referring to FIG. 3, a terminal receives LASeR content in step 300, and decodes the received LASeR content in step 310. In step 320, the terminal checks LASeR commands from the decoded LASeR content and carries out the LASeR commands. In an exemplary implementation, the terminal parses LASeR scene components included in the LASeR commands. The LASeR command represents a change in the scene and is represented using a declarative method. The LASeR command may include declarations such as 'NewScene' to render a new scene, 'Insert' to insert elements and attributes, 'Delete' to delete elements and attributes, etc. The LASeR scene components include therein elements for representing media and graphic entities constituting the scene with the declarative method, attributes for representing attributes of the elements, events, scripts, etc.

Since the LASeR content received by the terminal includes stereoscopic 3D image/video information, the terminal parses scene information including the stereoscopic 3D image/video information in step 330. The term "scene information" refers to temporal information, information on spatial configuration of elements constituting the scene, properties of the elements, and processes of interaction. The terminal handles all events of the LASeR content in step 340, and determines in step 350 to display a media object according to time information of the media object. With regard to step 350, the terminal determines that the media object to be included in scene description is stereoscopic 3D image/video according to the stereoscopic 3D image/video information. Since the LASeR content includes stereoscopic 3D image/video as a scene component, the terminal determines that it will display 3D image/video according to time information of the stereoscopic 3D image/video. In step 360, the terminal renders and displays scene components of the LASeR content including the stereoscopic 3D image/video. Here, the stereoscopic 3D image/video is serviced according to the information parsed in step 330. Table 2 illustrates an example of a schema in which an attribute indicating whether stereoscopic 3D image/video is provided is defined in LASeR header information of the LASeR content. For reference, the term "schema" refers to a kind of modeling document where a data structure is defined. The LASeR header information can be checked before the terminal checks the LASeR command in step 320 of FIG. 3. As illustrated in Table 2, the new attribute of the LASeR header can be defined by extending an attribute group of the LASeR header. Table 2 is an example of a schema in which a new attribute that indicates whether stereoscopic 3D image/video is provided is defined as 'stereoscopic', and a type of the attribute is defined as Boolean. The new attribute 'stereoscopic' is used to indicate whether the media object used as a scene component of the LASeR content is stereoscopic 3D image/video. Also, when an attribute value of the new attribute is 'true', it can also be used as an instruction to determine if the receiving terminal is capable of processing stereoscopic 3D image/video data. In exemplary embodiments of the present invention, when an attribute value of 'stereoscopic' is 'true', it indicates that the media object used as a scene component of the LASeR content is stereoscopic 3D image/video. Alternatively, if the attribute value of 'stereoscopic' is 'false', it indicates that the media object used as a scene component of the LASeR content is not stereoscopic 3D image/video. In the case where the attribute value of 'stereoscopic' is used as an instruction to check terminal information indicating if the receiving terminal is capable of processing stereoscopic 3D image/video data, if the attribute value of 'stereoscopic' is 'true', the LASeR engine checks terminal information indicating if the receiving terminal is capable of processing stereoscopic 3D image/video data, or whether the receiving terminal is in the state where it can process stereoscopic 3D image/video data.

TABLE 2

```
<xs:complexType name="LASeRHeaderTypeExt">
    <xs:complexContent>
        <xs:extension base="lsr:LASeRHeaderType">
            <attribute name="stereoscopic" type="boolean"
                use="optional"/>
        </xs:extension>
    </xs:complexContent>
</xs:complexType>
<element name="LASeRHeader" type="lsr:LASeRHeaderTypeExt"/>
```

In the example provided herein, a schema is used to define attributes and elements. The schema used herein follows 'XML Schema' syntax, and the schema can be defined using elements of the schema, complex type 'complexType' for specifying a declarable element content, complex content 'complexContent' for making a new type using the existing type, and 'extension' for adding it to the existing data type and declaring it. Although there are various possible methods for defining a structure of attributes and elements, a method having the same meaning, even though it is not a method using the schema, is envisioned by exemplary embodiments of the present invention. In Table 2, a prefix 'lsr:' refers to the details that can make reference to a name space prefix declared as 'lsr'. In other words, it refers to the details that the LASeR engine can parse.

Table 3A and Table 3B illustrate examples of schemas in which elements 'stereoscopicVideo' and 'stereoscopicImage' are defined. The elements 'stereoscopicVideo' and 'stereoscopicImage' represent stereoscopic 3D image/video and include its information. As to the types of the elements 'stereoscopicVideo' and 'stereoscopicImage', 'stereoscopicVideoType' and 'stereoscopicImageType' can be defined by extending the attribute types 'videoType' and 'imageType' of the elements 'video' and 'image', which are elements for scene description of the conventional LASeR.

TABLE 3A

```
<complexType name="stereoscopicVideoType">
    <complexContent>
        <extension base="lsr:videoType">
            ...
        </extension>
    </complexContent>
</complexType>
<element name="stereoscopicVideo"
    type="lsr:stereoscopicVideoType"/>
```

TABLE 3B

```
<complexType name="stereoscopicImageType">
    <complexContent>
        <extension base="lsr:imageType">
            ...
        </extension>
    </complexContent>
</complexType>
<element name="stereoscopicImage"
    type="lsr:stereoscopicImageType"/>
```

Table 4A to Table 4C illustrate examples of schemas where new attributes indicating information on stereoscopic 3D image/video are defined.

Figure 1:
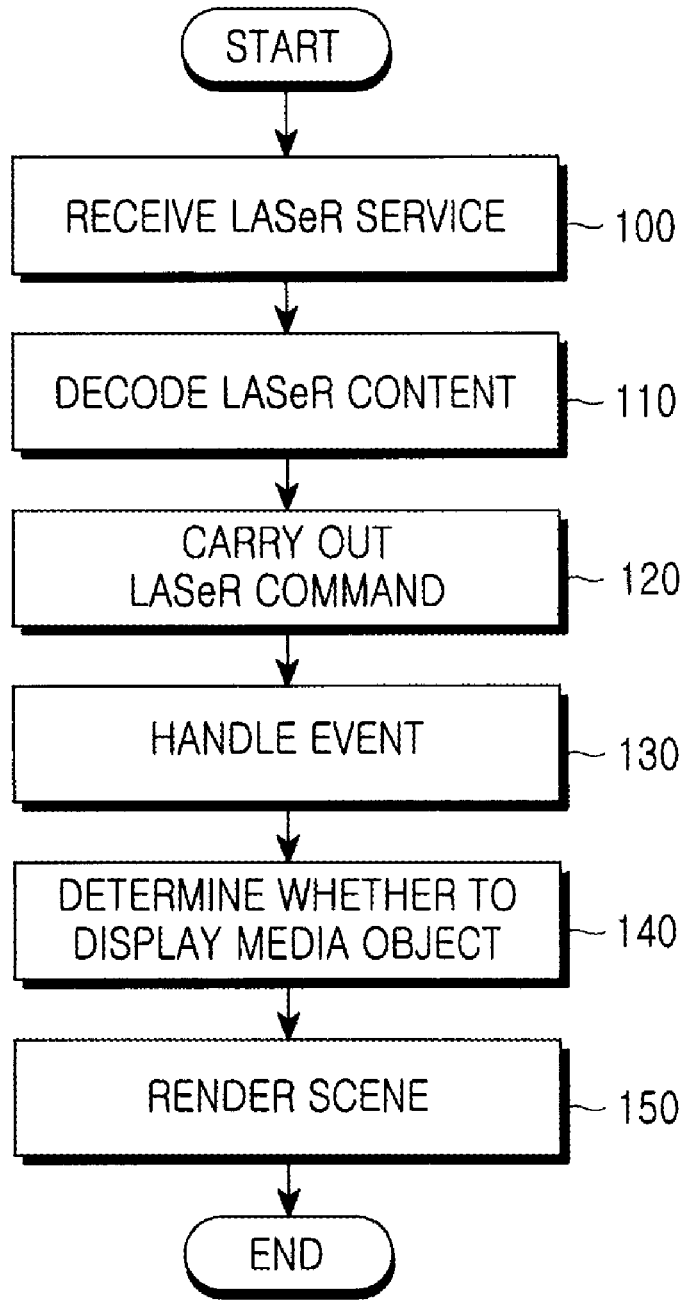
FIG. 1 is a control flow diagram for processing a received LASeR data stream by a LASeR engine according to the conventional art.
Figure 2A:
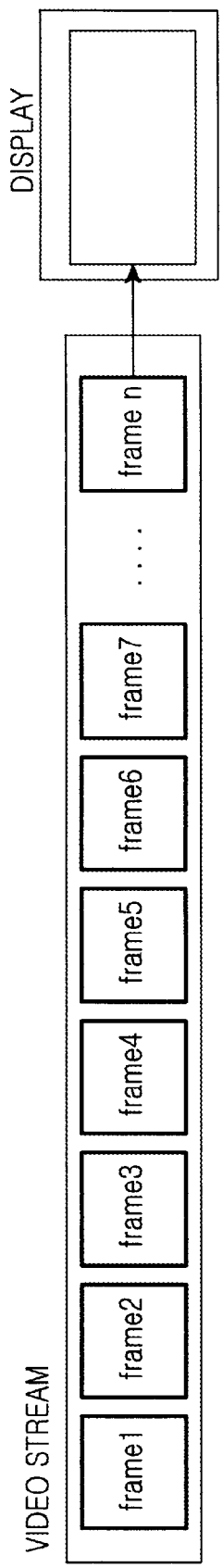
FIG. 2A is a diagram illustrating a conventional video stream.
Figure 2B:
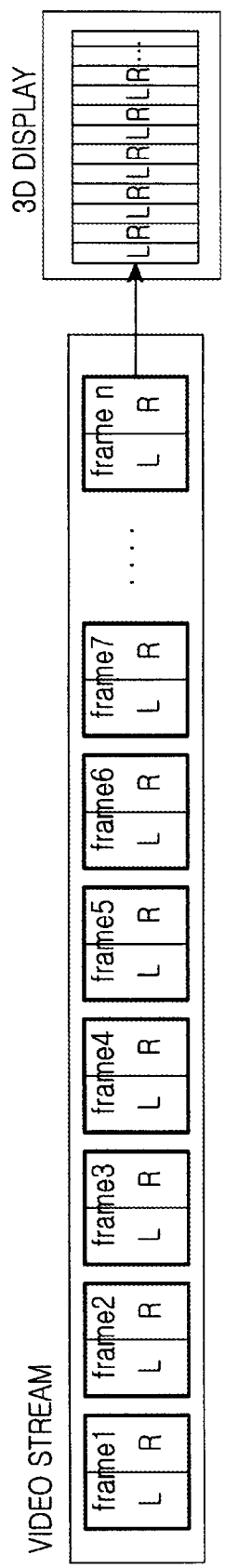
FIGS. 2B to 2E are diagrams illustrating conventional stereoscopic video streams.
Figure 2C:
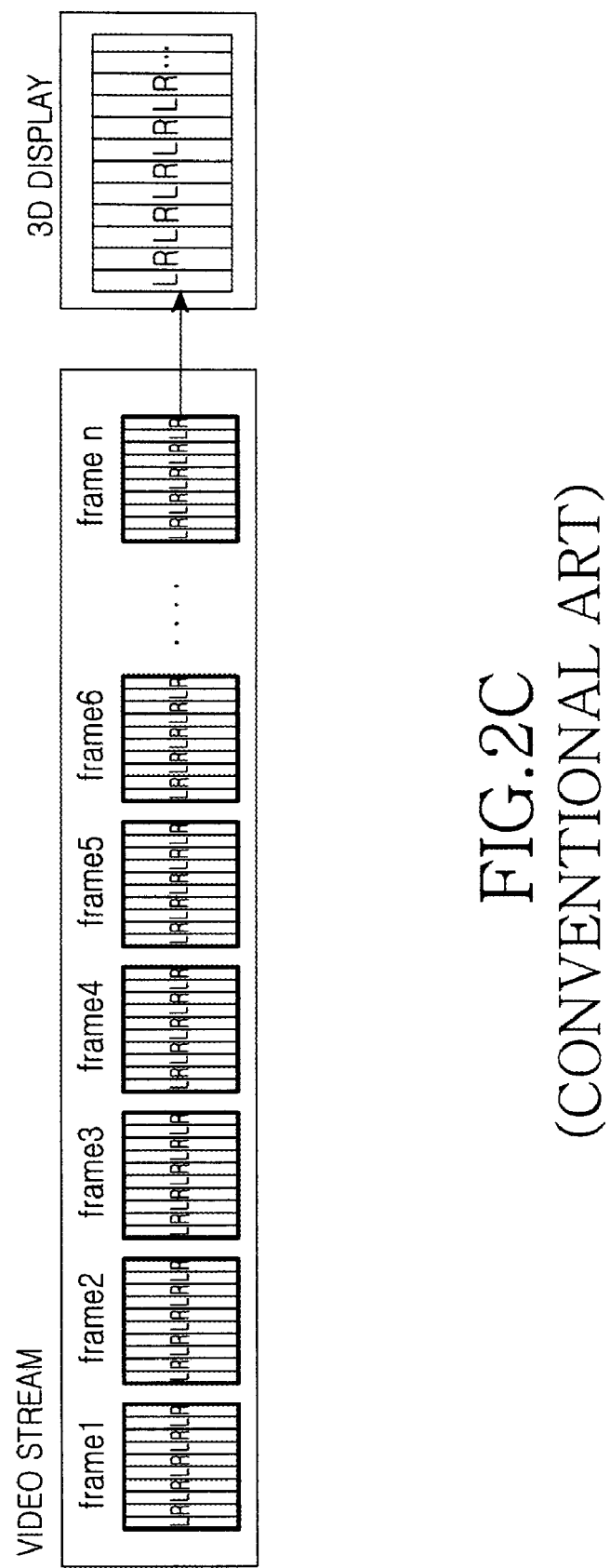
Figure 2D:
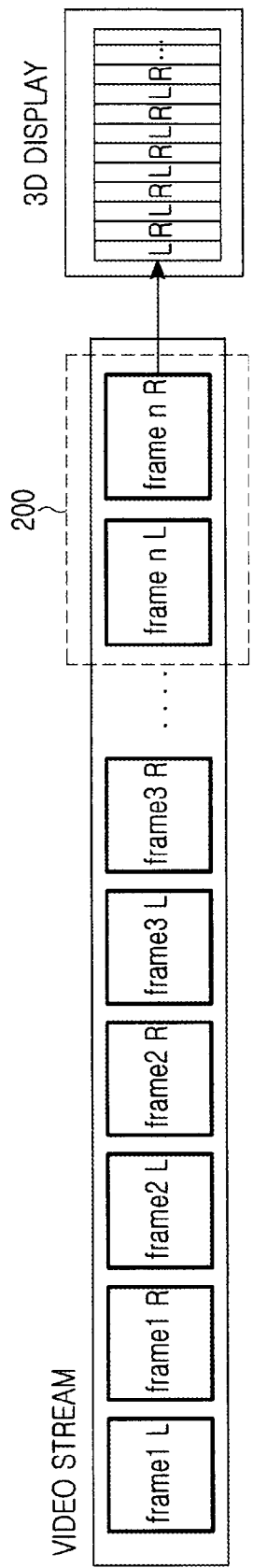
Figure 2E:
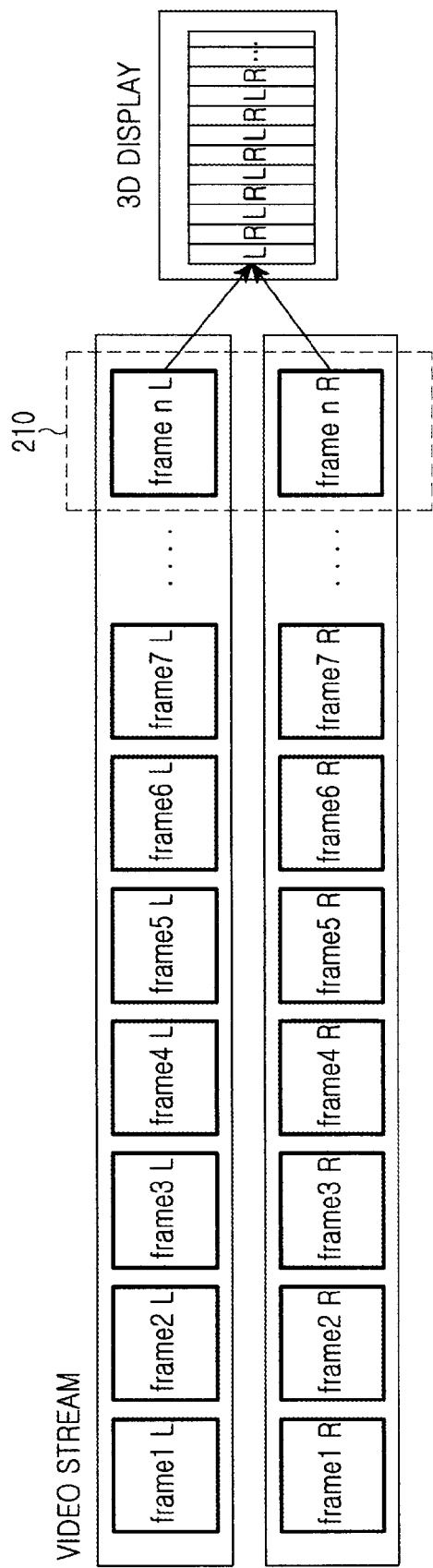

Table 4A illustrates an example of defining an attribute 'compositionType' that indicates how stereoscopic 3D image/video is configured. An attribute value of 'compositionType', as defined by 'stereoscopicCompositionType', can include 'side-by-side type', 'vertical line interleaved type', 'frame sequential type', and 'Left/Right view sequence type'. The 'side-by-side type' is a composition type of stereoscopic 3D image/video composed of one video stream where the left and right images/videos are contained in one frame, similar to that illustrated in FIG. 2B. The 'vertical line interleaved type' is a composition type of stereoscopic 3D image/video composed of one video stream where the left and right images/videos are contained in one frame in a line by line interleaving manner, similar to that illustrated in FIG. 2C. The 'frame sequential type' is a composition type of stereoscopic 3D image/video composed of one video stream where the left and right image/video frames alternately occur, similar to that illustrated in FIG. 2D. The 'Left/Right view sequence type' is a composition type of stereoscopic 3D image/video composed of independent left and right image/video streams, similar to that illustrated in FIG. 2E. In addition to the composition types of stereoscopic 3D image/video described above, the composition types can include 'top and bottom type' for configuring the left and right images/videos in the top and the bottom of one frame, respectively, 'pixel-by-pixel type' for configuring the left and right images/videos on a pixel-by-pixel basis, and various other types. The attribute values can be expressed using other names or values, if they are equal in meaning.

TABLE 4A

```
<attribute name="compositionType"
    type="stereoscopicCompositionType" use="optional"/>
<simpleType name="stereoscopicCompositionType">
    <restriction base="string">
        <enumeration value="side-by-side type"/>
        <enumeration value="vertical line interleaved type"/>
        <enumeration value="frame sequential type"/>
        <enumeration value="Left/Right view sequence type"/>
        <!-- enumeration value="top and bottom type"/ -->
        <!-- enumeration value="pixel-by-pixel type"/ -->
    </restriction>
</simpleType>
```

Table 4B illustrates an example of a schema in which an attribute 'priorView' is defined that indicates which of two images/videos constituting stereoscopic 3D image/video, i.e., which of the left image/video and the right image/video, is the basic image/video that should be first represented. In Table 4B, an attribute value of 'priorView' can use 'LEFT_view' and 'RIGHT_view' as defined by 'priorView-Type'. Use of the value 'LEFT_view' means that the left image/video of stereoscopic 3D image/video should be first represented, and use of the value 'RIGHT_view' means the right image/video of stereoscopic 3D image/video should be first represented. The attribute value can also be defined as 'primaryView' and 'secondaryView' indicating whether priority of one of the images/videos constituting stereoscopic 3D image/video is higher or lower in image/video representation. For 3D image/video made by extracting a 3D object from several cuts of image/video at various angles, it is necessary to select the basic image/video that should be first represented among the several cuts of image/video, rather than selecting the left or right images/videos. In such a case, the first cut can be represented with attribute values of integers. If a value of the new attribute 'priorView' is 'LEFT_view', it means that the left image/video, out of the left and right images/videos constituting stereoscopic 3D image/video, has priority in image/video representation. In that case, the left image/video should be displayed when a terminal that cannot support 3D image/video and must select and display only one of the left and right images/videos receives the transmission. In the example of Table 4B, an attribute value of 'priorViewType' has been described in an enumeration manner. However, it can also be designated as various data types according to an expression method for attribute values of 'string', 'boolean', 'anyURI', 'hexbinary', 'base64Binary', 'mormalizedString', 'NMTOKENS', 'ID', 'IDREF', 'Integer' and 'PositiveInteger'.

TABLE 4B

<attribute name="priorView" type="priorViewType" use="optional"/>
<simpleType name="priorViewType">
 <restriction base="string">
  <enumeration value="LEFT_view"/>
   <enumeration value="RIGHT_view"/>
 </restriction>
</simpleType>

Table 4C illustrates an example of a schema in which a 'stereoscopicMode' attribute is defined that indicates whether it will support stereoscopic 3D image/video with a 3D image/video mode or a normal image/video mode. An attribute value of 'stereoscopicMode' can be defined as a Boolean type, or can be defined to represent it as 'ON' and 'OFF'. The attribute 'stereoscopicMode' is for providing a 3D image/video service according to whether a user terminal can process stereoscopic 3D image/video, or according to the user's preference.

With use of this attribute, it is possible to change the service mode of 3D image/video according to the terminal type or user information. For the user who does not want the stereoscopic 3D image/video service, the attribute 'stereoscopicMode' can be set as 'stereoscopicMode=false' or 'stereoscopicMode=OFF'. Alternatively, for the user who wants the stereoscopic 3D image/video service, the attribute 'stereoscopicMode' can be set as 'stereoscopicMode=true' or 'stereoscopicMode=ON'.

The attribute 'stereoscopicMode' can also be used as an attribute for other scene components of LASeR, by using it independently rather than using it along with an element or attribute indicating stereoscopic 3D image/video information. For example, when there is an intention to service a different scene description according to whether the terminal supports stereoscopic 3D image/video and whether the user prefers 3D image/video, LASeR content can be composed of one scene set with 'stereoscopicMode=true' and another scene set with 'stereoscopicMode=false'. In this case, even though a transmission side provides the same LASeR content to various terminals and users, the reception side can receive a different scene set according to whether the terminal supports stereoscopic 3D image/video and whether the user prefers 3D image/video. For example, in the case where a user receives the same LASeR content through two different terminals, even though the user has received the same content, the user may view a scene with 'stereoscopicMode=true' on one terminal and a scene with 'stereoscopicMode=false' on another terminal. In this case, the attribute 'stereoscopicMode' can be used as an attribute of a container element such as 'g', 'switch' and 'lsr:selector', which can include various elements. The term 'container element' refers to an element that can include other elements therein.

TABLE 4C

<attribute name="stereoscopicMode" type="boolean" use="optional"/>
<!-- OR -->
<attribute name="stereoscopicMode"
type="stereoscopicModeType" use="optional"/>
<simpleType name="stereoscopicModeType">
 <restriction base="string">
  <enumeration value="ON"/>
   <enumeration value="OFF"/>
 </restriction>
</simpleType>

The new attributes "compositionType", "priorView" and "stereoscopicMode" indicating information on stereoscopic 3D image/video, defined in Table 4A to Table 4C, can be used as 'stereoscopicVideoType' and 'stereoscopicImageType' described in Table 3A and Table 3B. Table 5 illustrates an example of a schema in which 'stereoscopicVideoType' and 'stereoscopicImageType' are defined that include attribute information for the stereoscopic 3D image/video defined by exemplary embodiments of the present invention.

TABLE 5

<complexType name="stereoscopicVideoType">
 <complexContent>
  <extension base="lsr:videoType">
   <attribute name="compositionType" type="stereoscopicCompositionType" use="optional"/>
   <attribute name="priorView" type="priorViewType" use="optional"/>
   <attribute name="stereoscopicMode" type="boolean" use="optional"/>
  </extension>
 </complexContent>
 </complexType>
 <complexType name="stereoscopicImageType">
  <complexContent>

TABLE 5-continued

```
    <extension base="lsr:imageType">
        <attribute name="compositionType" type="stereoscopicCompositionType" use="optional"/>
        <attribute name="priorView" type="priorViewType" use="optional"/>
        <attribute name="stereoscopicMode" type="boolean" use="optional"/>
    </extension>
  </complexContent>
</complexType>
```

The 'stereoscopicVideoType' and 'stereoscopicImageType' defined as illustrated in Table 5 can further include properties of media entities such as video and image, and various information related to stereoscopic 3D image/video. In addition, 'stereoscopicVideoType' and 'stereoscopicImageType', or stereoscopic 3D image/video-related new attributes included therein, i.e., the new attributes of Table 4A to Table 4C, not only can be used as attributes of the newly defined elements 'stereoscopicVideo' and 'stereoscopicImage', but also can be added to an attribute of the existing element 'Video' or 'Image'. Further, the newly defined stereoscopic 3D image/video-related attributes can be used as attributes of scene components that include elements of stereoscopic 3D image/video independently.

When the elements and attributes have the same meanings, names of the elements and attributes or their attribute values are subject to change.

Table 6A to Table 6C illustrate examples of LASeR data for servicing LASeR content including stereoscopic 3D image/video using the new elements and attributes according to an exemplary embodiment of the present invention.

TABLE 6A

```
<!-- LASeR Header -->
<LASeRHeader ... stereoscopic="true"/>
<NewScene>
  <svg>
    ...
    <stereoscopicVideo x="10" y="10" width="100" height="100"begin="5"end="50"xlink:href="http://www.example.com/myfile.mp4#ffp(track_ID=1)"compositionType="frame sequential type"priorView="LEFT" stereoscopicMode="true"/>
  </svg>
</NewScene>
```

As illustrated in Table 6A, that the LASeR content includes stereoscopic 3D image/video is indicated by using the attribute 'stereoscopic' which was defined in Table 2. More specifically, in Table 6A the attribute 'stereoscopic' is set to "true" thus indicating the inclusion of stereoscopic 3D image/video. Referring again to Table 6A, the element 'stereoscopicVideo', which was defined in Table 3A, is described as an element of a scene description command 'NewScene' for carrying out an operation of rendering a new scene. The element 'stereoscopicVideo' describes having an image/video stream with 'track_ID=1' of stereoscopic 3D image/video with file name='myfile.mp4' be the displayed scene, and that the scene is displayed with a width '100' and a height '100' starting at the part (10, 10), and reproduced until the time '50' after a lapse of a time of about '5' from the start time of the LASeR content scene. A unit of the time '5' and '50' can be sec or msec for scene representation, and a unit of the space and length is subject to change according to the screen representation scheme. In addition, since a composition type of the image/video stream with 'track_ID=1' is 'frame sequential type', and an image/video having priority in scene representation is 'priorView=LEFT', the image/video stream is the left image/video, and since 'stereoscopicMode=true', it describes serving the image/video in the 3D image/video mode.

TABLE 6B

```
<NewScene>
  <svg>
    ...
    <video x="10" y="10" width="100" height="100"begin="5"end="50"xlink:href="http://www.example.com/myfile.mp4#ffp(track_ID=1)"compositionType="frame sequential type"priorView="LEFT" stereoscopicMode="true"/>
  </svg>
</NewScene>
```

Table 6B illustrates an example of representing the same LASeR data as that of Table 6A by adding the new attributes defined by exemplary embodiments of the present invention to the existing element 'video' without defining a new element for stereoscopic 3D image/video. The attribute defined on the LASeR header as illustrated in the example of Table 6B may not be used.

Even when only 'stereoscopicMode=true' among the new attributes defined by exemplary embodiments of the present invention is added to the existing element 'video', since it is possible to check that the corresponding element 'video' is stereoscopic 3D image/video, the terminal can check and control a state of the LCD Barrier to provide stereoscopic 3D image/video, or can prevent an error of recognizing only one of two image/video streams constituting the stereoscopic 3D image/video.

TABLE 6C

```
...
<stereoscopicVideo
...
src01="http://www.example.com/myfile.mp4#ffp(track_ID=1)"
src02="http://www.example.com/myfile.mp4#ffp(track_ID=2)"
compositionType="Left/Right view sequence type"
priorView="PrimaryView"
stereoscopicMode="true"
/>
...
```

Table 6C illustrates an example of defining new attributes 'src01' and 'src02' that perform the same operation as 'xlink:href', and describing both of two image/video streams with 'compositionType=Left/Right view sequence type', made by separately including the left image/video and the right image/video in the two image/video streams. In this case, the terminal can provide a 3D image/video service, determining that it should simultaneously service the two image/video streams.

In the case of Table 6A and Table 6B in which neither of the two image/video streams with 'compositionType=Left/Right view sequence type' are described, in order to process multiple video streams, the terminal can provide stereoscopic content by finding another image/video stream, i.e., the right image/video, which makes a pair with the left image/video, when an image/video stream describing stereoscopic 3D image/video, which is related to one image/video stream, reference to which is made through the attribute 'xlink:href', is the right image/video.

Figure 4:
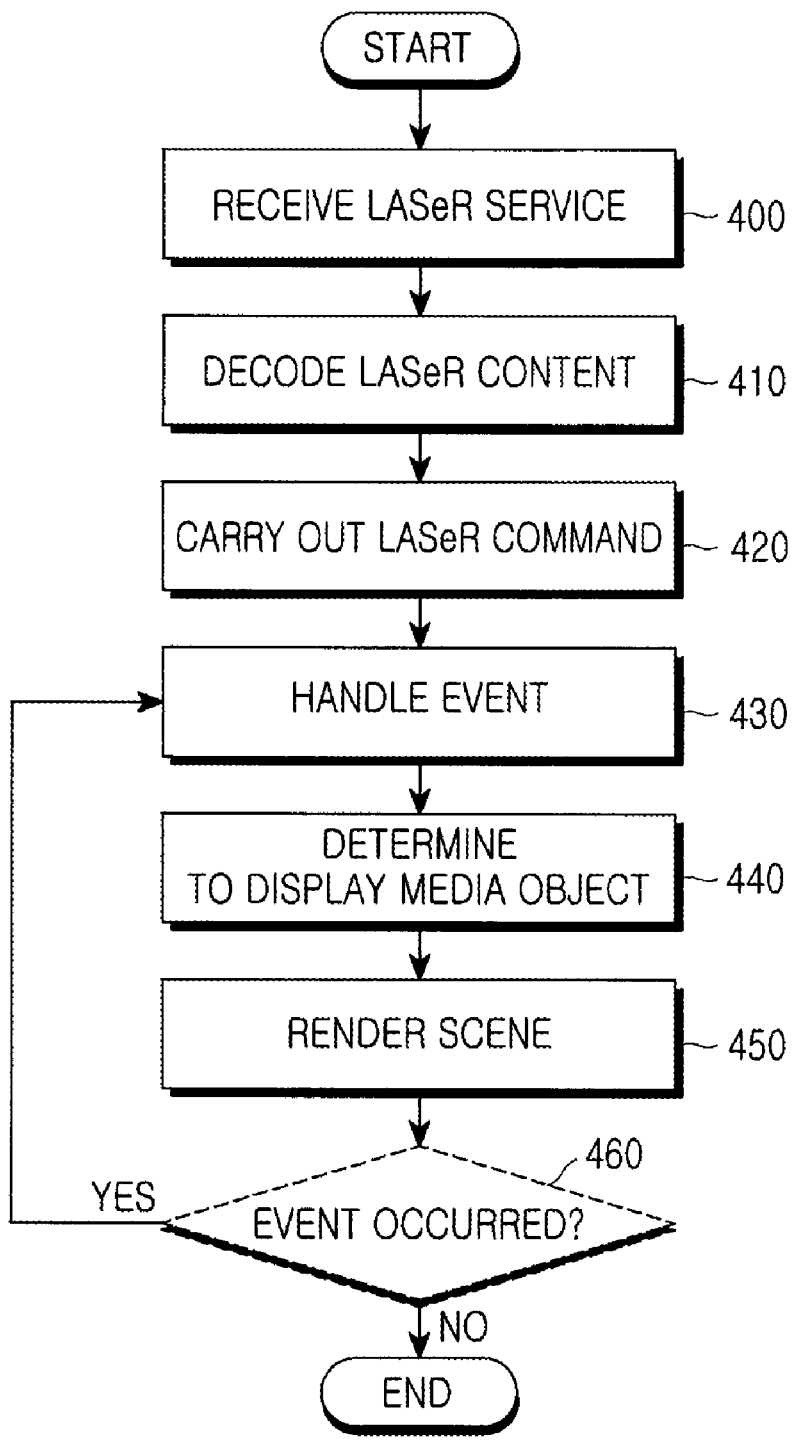
FIG. 4 is a flowchart illustrating an operation of a terminal that received LASeR content according to a second exemplary embodiment of the present invention.

FIG. 4 is a flowchart illustrating an operation of a terminal that received LASeR content according to a second exemplary embodiment of the present invention. Compared with the first exemplary embodiment illustrated in FIG. 3, the second exemplary embodiment provides a more detailed step for handling an event when the event occurs.

In a LASeR data stream according to the second exemplary embodiment of the present invention, management of a network session, a change in operation in a decoding process and a terminal, or the details for input/output of data or an interface can be defined as an event. Upon detecting the defined event, a LASeR engine can make a change in a scene for the corresponding event or a change in operation of the terminal. With reference to FIG. 4, a description will now be made of the second exemplary embodiment in which the new event is the determining of a change in the terminal type.

Referring to FIG. 4, a terminal receives LASeR content in step 400. The terminal decodes the received LASeR content in step 410, and checks and carries out LASeR commands in the decoded LASeR content in step 420. At this point, the terminal parses LASeR scene components included in the LASeR commands. That is, when the received LASeR content includes stereoscopic 3D image/video information, the terminal parses it. In step 430, the terminal handles all events of the LASeR content and handles a new event caused by a change in terminal type. In step 440, the terminal determines whether it will display a media object according to time information of the media object. In step 440, when the LASeR content includes stereoscopic 3D image/video as a scene component, the terminal determines that it will display 3D image/video according to time information of the stereoscopic 3D image/video. In step 450, the terminal renders and displays scene components of the LASeR content. As for the LASeR content including stereoscopic 3D image/video, the LASeR content is serviced to the user according to the stereoscopic 3D image/video information parsed in step 420. For the new event, the terminal can directly detect and handle it in step 430. Alternatively, an input of the user is received after the scene is displayed or the new event can occur according to the state change of the terminal as in step 460. As an example of handling the occurred new event, if the terminal, or the LASeR engine, detects occurrence of the new event in step 460, the terminal proceeds to step 430 where it can execute an associated element 'script' through a listener element 'ev:listener'.

Table 7A and Table 7B illustrate examples of defining a new event for a change in the stereoscopic 3D image/video mode defined in the second exemplary embodiment of the present invention.

TABLE 7A

| Name | Namespace | Description |
| --- | --- | --- |
| stereoscopic_ON | Urn:mpeg:mpeg4:laser:2008 | It occurs when the terminal can provide 3D image/video. |
| stereoscopic_OFF | Urn:mpeg:mpeg4:laser:2008 | It occurs when the terminal cannot provide 3D image/video. |

An event 'stereoscopic_ON' defined in Table 7A is an example of an event that occurs when the terminal can now support 3D image/video. The corresponding event may occurs when the terminal can provide 3D image/video because an LCD Barrier of the terminal is turned ON, a program or terminal's function for processing 3D image/video is activated, or when the terminal can provide 3D image/video as the currently provided image/video content changes to the 3D image/video content. An event 'stereoscopic_OFF' is an example of an event that occurs when the terminal transitions to the state where it cannot support 3D image/video. The corresponding event occurs, for example, when the terminal cannot provide 3D image/video because an LCD Barrier of the terminal is turned OFF, a program or terminal's function for processing 3D image/video is inactivated, or when the terminal cannot provide 3D image/video because the currently provided image/video content changes to the normal image/video content.

TABLE 7B

| Name | Namespace | Description |
| --- | --- | --- |
| stereoscopicModeChanged | Urn:mpeg:mpeg4:laser:2008 | It occurs when the terminal's 3D image/video support mode is changed. |

An event 'stereoscopicModeChanged' defined in Table 7B is an example of an event that occurs when the terminal's 3D image/video supportability is changed. For example, the event 'stereoscopicModeChanged' occurs when the terminal transitions from the state where it can support 3D image/video to the state where it cannot support 3D image/video, or when the terminal transitions from the state where it cannot support 3D image/video to the state where it can support 3D image/video. That is, this is an event indicating the change in the terminal's 3D image/video support mode. The terminal's 3D image/video support mode can be changed by an input from the user through a keypad or touch screen (not shown).

Table 8A illustrates an example of describing a scene using the event defined in Table 7A. When an event 'stereoscopic_ON' occurs, i.e., when the terminal's stereoscopic 3D image/video mode is activated (e.g. when the user turns ON the terminal's stereoscopic 3D image/video mode), an event listener recognizes this and orders an event handler to perform the corresponding operation '#stereoscopicModeON'. The event listener and the event handler, which are one of the LASeR scene components, order a LASeR scene tree manager (710 of FIG. 7) to parse LASeR data and perform an operation to the event listener and the event handler. The operation '#stereoscopicModeON' changes the value of the attribute 'stereoscopicMode' of a corresponding element from 'stereoscopicMode=false', to 'true' depending on a scene component with an attribute 'id'='video01'. As long as a terminal's operation or signal flow for handling the event, and the corresponding event have the same meanings, the event handler's operation can be changed to various operations and methods.

TABLE 8A

```
<ev:listener handler="#sterescopicModeON" event="stereoscopic_ON"/>
<script id="stereoscopicModeON">
   <lsr:Replace ref="video01" attributeName="stereoscopicMode"
value="On"/>
</script>
<video id="video01"... stereoscopicMode="false".../>
...
```

Table 8B illustrates an example of describing a scene using the event defined in Table 7B. When the event 'stereoscopicModeChanged' occurs, the event listener recognizes the condition and orders the event handler to perform a corresponding operation '#refreshScene'. The operation '#refreshScene' carries out a command 'refreshScene' for making an order to refresh the current scene.

TABLE 8B

```
<ev:listener handler="#refreshScene"
event="stereoscopicModeChanged"/>
<script id="refreshScene">
  <lsr:refreshScene/>
</script>
<NewScene>
    <switch>
      <g stereoscopicMode="ON">
        <StereoscopicVideo xlink:href="a.mpg#ffp(trackID=1)"
compositionType="side-by-side type" priorView="LEFT" />
      </g>
      <g stereoscopicMode="OFF">
        <video xlink:href="a.mpg#ffp(trackID=3) "/>
      </g>
    </switch>
</NewScene>
```

The elements, attributes and events newly defined by exemplary embodiments of the present invention can also be expressed using a scheme of separately defining them in the exterior for future reference. A scheme of making reference to the data defined in the exterior can make reference to the data by searching or detecting systemized information of the corresponding data, or linking the information provided as URI type. Even for the values of elements or attributes, reference can be made to them when they are separately defined or provided in the exterior.

Figure 5:
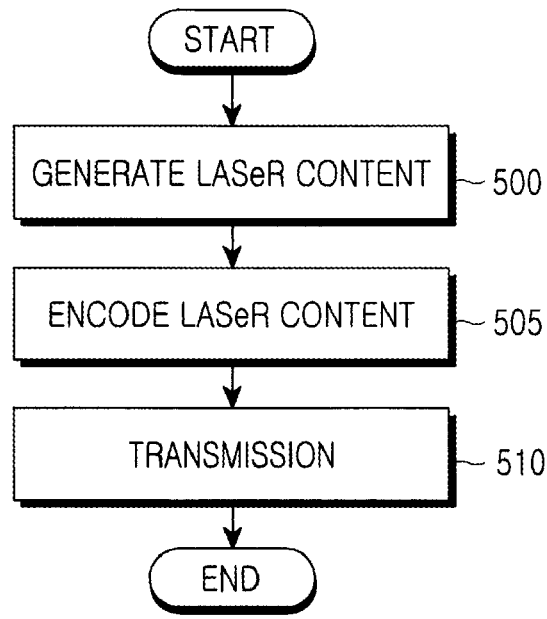
FIG. 5 is a flowchart illustrating a process of transmitting LASeR content by a transmitter according to an exemplary embodiment of the present invention.

FIG. 5 is a flowchart illustrating a process of transmitting LASeR content according to an exemplary embodiment of the present invention. In step 500, a transmitter generates LASeR content including the stereoscopic 3D image/video information and event defined in the first and second exemplary embodiments of the present invention. In step 505, the transmitter encodes the LASeR content generate in step 500. In step 510, the transmitter transmits the LASeR content encoded in step 505.

Figure 6:
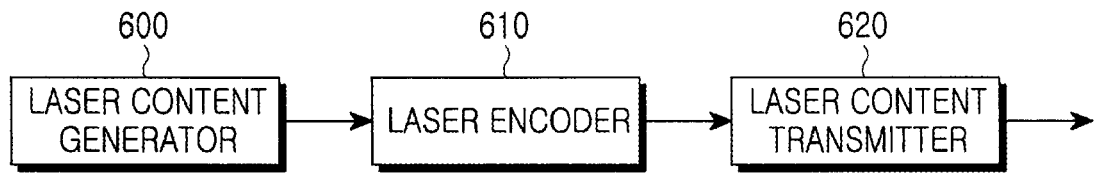
FIG. 6 is a block diagram illustrating a structure of a transmitter according to an exemplary embodiment of the present invention.

FIG. 6 is a block diagram illustrating a structure of a transmitter according to an exemplary embodiment of the present invention.

Referring to FIG. 6, a LASeR content generator 600 generates LASeR data including at least one of the stereoscopic 3D image/video information and event described in the first and second exemplary embodiments of the present invention. Here, media data such as video and audio constituting the LASeR content can be included together, generating one logical stream. Otherwise, the media data can be separated from the LASeR data and delivered separately. The LASeR content generator 600 delivers the generated LASeR content to a LASeR encoder 610. The LASeR encoder 610 encodes the LASeR content provided from the LASeR content generator 600, and provides the encoded LASeR content to a LASeR content transmitter 620. The LASeR content transmitter 620 transmits, to a terminal, the encoded LASeR content provided from the LASeR encoder 610.

Figure 7:
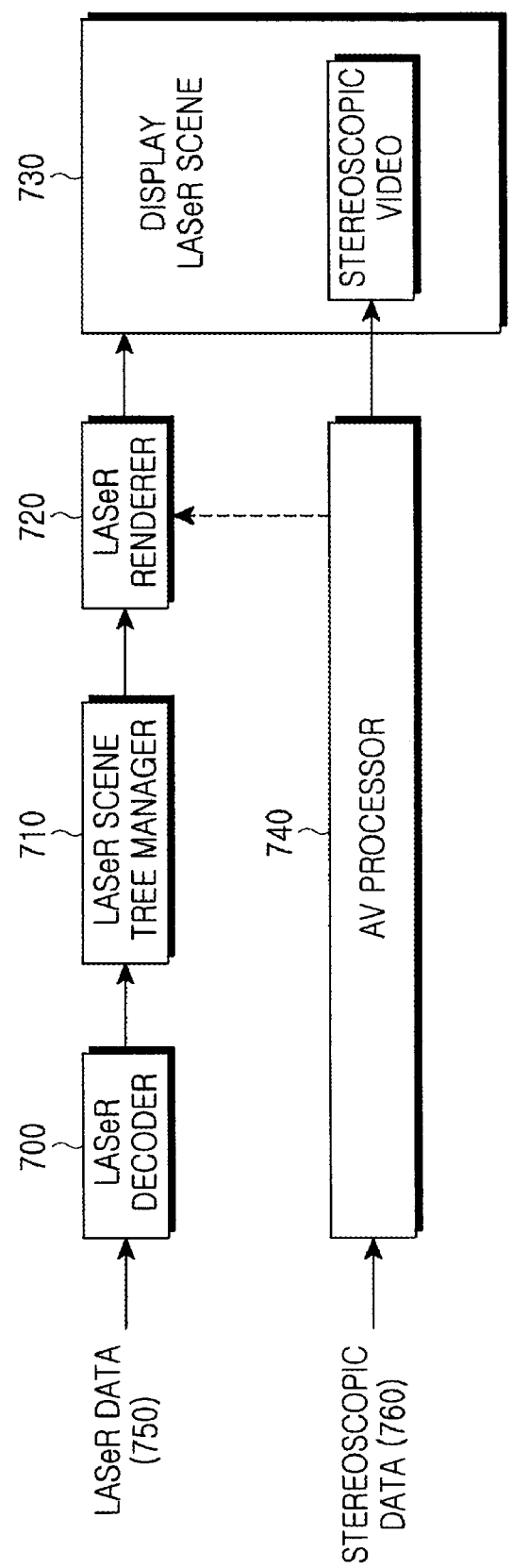
FIG. 7 is a block diagram illustrating a structure of a receiver according to an exemplary embodiment of the present invention.

FIG. 7 is a block diagram illustrating a structure of a receiver according to an exemplary embodiment of the present invention.

Referring to FIG. 7, stereoscopic data 760, which may include stereoscopic 3D image/video data the terminal received, is input to an Audio/Video (AV) processor 740. LASeR data 750, which may include a LASeR data stream, is input to a LASeR decoder 700. When media data such as video and audio constituting the LASeR content is included together and generates one logical stream, a process can be included, in which the terminal classifies received stereoscopic 3D image/video data and data streams according to characteristics of physical streams before it inputs them to their associated data processors. The LASeR decoder 700 decodes the received LASeR data and delivers it to a LASeR scene tree manager 710. The LASeR data includes scene description information indicating temporal information, spatial information and properties of elements constituting the LASeR content. The term 'LASeR content' refers to the content that includes LASeR data which is scene description information indicating temporal information, spatial information and properties of all resource elements displayed in the scene actually serviced in the terminal, and elements constituting the LASeR content, including all media having Video and Audio. The LASeR scene tree manager 710 parses scene component information including a new event and stereoscopic 3D image/video information such as composition type information, information on image/video having priority, and stereoscopic mode information, described in the exemplary embodiments of the present invention, and checks the details of an operation caused by use or occurrence of the event. That is, the LASeR scene tree manager 710 performs scene description control for parsing the LASeR data output from the LASeR decoder 700 and describing a scene. An operation of checking stereoscopic 3D image/video information according to a stereoscopic 3D image/video attribute and configuring 3D image/video as a LASeR scene component according to the stereoscopic 3D image/video information is also performed in the LASeR scene tree manager 710. The LASeR scene tree manager 710 delivers the checked scene description information to a LASeR renderer 720. The LASeR renderer 720 generates and outputs LASeR data according to the LASeR scene description information provided from the LASeR scene tree manager 710. According to an exemplary embodiment of the present invention, when an attribute value of 'stereoscopic' is 'true', the LASeR scene tree manager 710 determines that a media object used as a scene component of the LASeR content is stereoscopic 3D image/video, and when an attribute value of 'stereoscopic' is 'false', the LASeR scene tree manager 710 determines that a media object used as a scene component of the LASeR content is not stereoscopic 3D image/video. When an event occurs in which the terminal's 3D image/video support mode is changed, the LASeR scene tree manager 710 recognizes an event 'stereoscopicModeChanged' indicating the change in the terminal's 3D image/video support mode and performs an operation corresponding thereto.

The LASeR data rendered by the LASeR renderer 720 is displayed on the terminal by means of a display 730. However, the stereoscopic 3D image/video data delivered to the AV processor 740 is displayed on the display 730 of the terminal as a part of the scene that the LASeR renderer 720 renders according to scene description information such as position of stereoscopic 3D image/video data, time information, composition type information, information on image/video having priority, and stereoscopic mode information, parsed by the LASeR scene tree manager 710. The display 730 outputs, to the user, the LASeR scene provided from the LASeR renderer 720, and the stereoscopic video provided from the AV processor 740. That is, the display 730 displays stereoscopic 3D image/video data provided from the AV processor 740, as a part of the LASeR scene that the LASeR renderer renders according to the LASeR scene description information.

Figure 8:
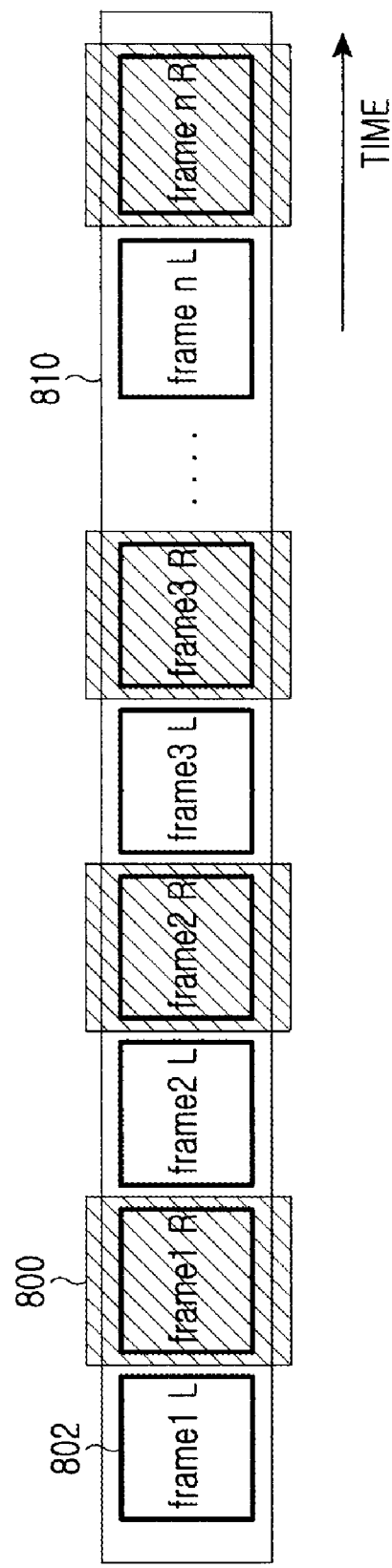
FIG. 8 is a diagram illustrating an example of an optimization processing method for 'frame sequential type' according to an exemplary embodiment of the present invention.

FIG. 8 is a diagram illustrating an example of an optimization processing method for 'frame sequential type' according to an exemplary embodiment of the present invention. Specifically, FIG. 8 is a diagram illustrating an example of an optimization processing method for 'side-by-side type' according to an exemplary embodiment of the present invention. For 'Left/Right view sequence type', it can be simply processed since it only needs to select and reproduce an image/video stream corresponding to 'priorView'. However, when the left and right image/video information is configured in one video stream together as in the 'frame sequential type' or 'side-by-side type', the processing is more difficult.

For the stereoscopic 3D image/video configured in 'frame sequential type' of FIG. 8, since the left and right image/video frames alternately appear 810, it is also possible to process the stereoscopic 3D image/video in a method of first checking a value of an attribute 'priorView', hiding the image/video frame with no 'priorView' as illustrated by reference numeral 800 by checking the number of frames per second, and continuously displaying the image/video frame with 'priorView' for times in which the image/video frame with no 'priorView' should be provided. For example, for image/video with 'priorView=LEFT', the optimization processing method hides the entire right image/video 800, and then displays the left image/video 802 of the first frame Frame1 for the time when the right image/video of the first frame Frame1 should be displayed.

Figure 9:
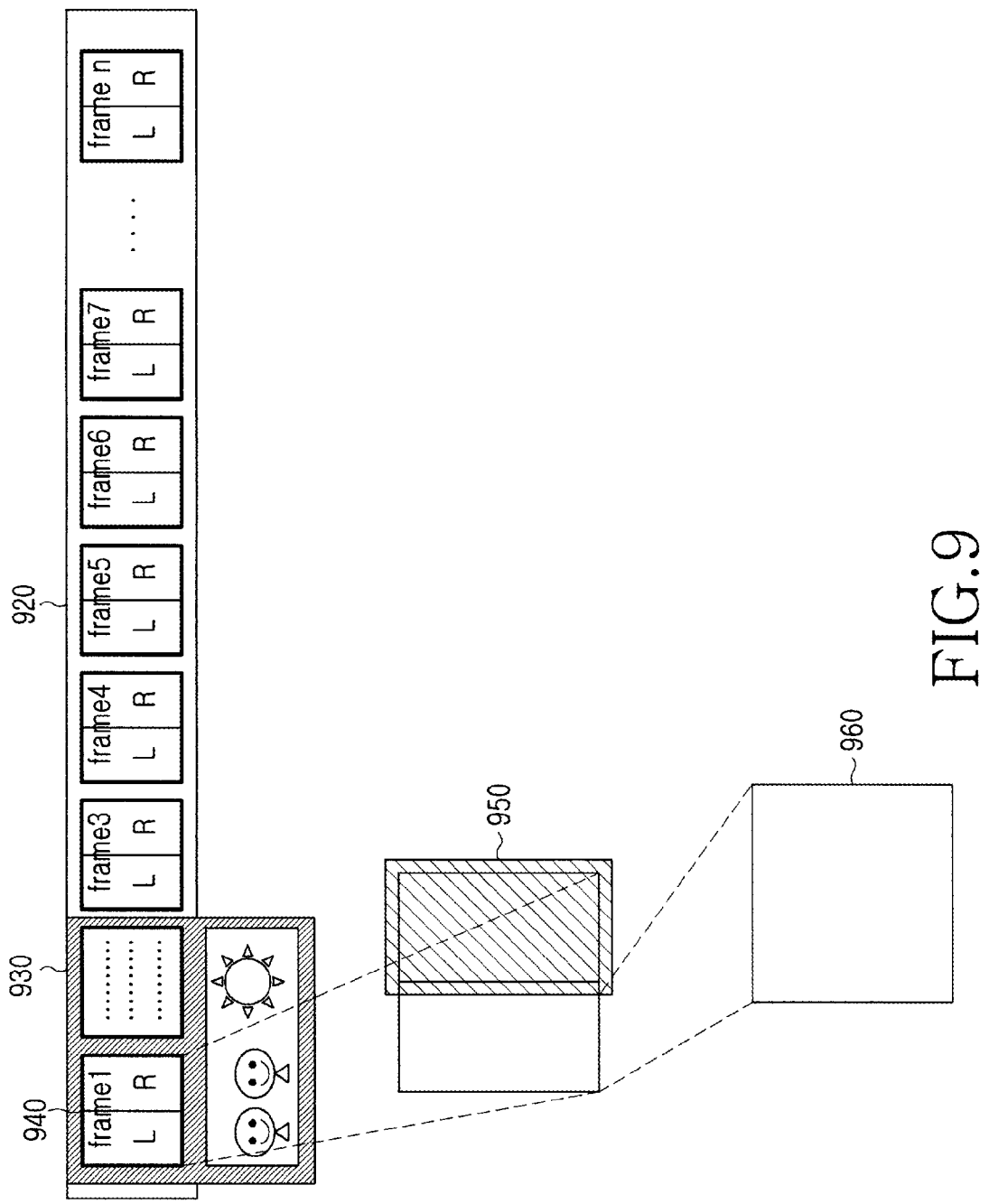
FIG. 9 is a diagram illustrating an example of optimization processing method for 'side-by-side type' according to an exemplary embodiment of the present invention.

FIG. 9 is a diagram illustrating an example of optimization processing method for 'side-by-side type' according to an exemplary embodiment of the present invention.

Referring to FIG. 9, a video stream 920 is a sequence of frames configured in 'side-by-side type'. In 'side-by-side type', the left image/video and the right image/video are configured in one frame. Therefore, as illustrated in FIG. 9, the optimization processing method first determines a frame size of the first frame Frame1 940 from LASeR scene description 930, and determines if 'priorView' is set to hide the frame 950 in the region (i.e. no 'priorView'). Thereafter, the optimization processing method can extend a size of the region with 'priorView' to one frame size (full frame size), and display only the data 960 of the extended 'priorView' region on the terminal.

As illustrated in the examples of FIGS. 8 and 9, exemplary embodiments of the present invention provide a method for displaying an optimized image/video for the user when the terminal cannot support stereoscopic 3D image/video or the stereoscopic mode is 'OFF'. Of course, there are various possible alternative methods to those herein described.

As described above, exemplary embodiments of the present invention provide an apparatus and method for providing stereoscopic 3D image/video content on a LASeR-based terminal, for defining and transmitting attribute information containing information on stereoscopic 3D image/video content, so that a receiving terminal based on the LASeR service can control the stereoscopic 3D image/video content and display the optimal image/video.

Further, exemplary embodiments of the present invention provide an apparatus and method for providing stereoscopic 3D image/video content on a LASeR-based terminal, in which a receiving terminal that does not support stereoscopic 3D image/video content can extract and control data including therein information on the stereoscopic 3D image/video, making it possible to display the optimal image/video from the corresponding content.

As is apparent from the foregoing description, exemplary embodiments of the present invention define and transmit element and attribute information containing information on the stereoscopic 3D image/video content, so that a receiving terminal based on the LASeR service can control the stereoscopic 3D image/video content and display the optimal image/video.

Further, according to exemplary embodiments of the present invention, a receiving terminal that does not support stereoscopic 3D image/video content processes the corresponding content using information on the stereoscopic 3D image/video, making it possible to display the optimal image/video.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing stereoscopic three-dimensional (3D) content based on Lightweight Application Scene Representation (LASeR), the method comprising:
generating a stereoscopic 3D attribute in accordance with attribute protocols of LASeR;
generating a LASeR content including therein stereoscopic 3D information according to the stereoscopic 3D attribute or event;
encoding the generated LASeR content; and
transmitting the encoded LASeR content to a mobile terminal configured to display LASeR content,
wherein the stereoscopic 3D attribute comprises an attribute 'stereoscopic' for indicating an instruction to check if the receiving terminal is capable of processing a stereoscopic 3D image or video.

2. The method of claim 1, wherein the stereoscopic 3D attribute further comprises at least one of an attribute 'compositionType' for indicating a stereoscopic 3D composition type that indicates how the stereoscopic 3D image or video is composed, an attribute 'priorView' for indicating a basic image or video that should be first represented among left and right images or videos constituting the stereoscopic 3D image or video, an attribute 'stereoscopicMode' for indicating how the stereoscopic 3D image or video will be provided, and an attribute 'stereoscopicModeChanged' for indicating a change in the 3D image or video mode.

3. The method of claim 2, wherein the attribute 'compositionType' comprises at least one of 'side-by-side type' indicating a stereoscopic 3D image or video composed of one video stream where left and right images or videos are contained together in one frame, 'vertical line interleaved type' indicating a stereoscopic 3D image or video composed of one video stream where left and right images or videos are contained in one frame line by line in an interleaving manner, 'frame sequential type' indicating a stereoscopic 3D image or video composed of one video stream where left and right image or video frames alternately appear, and 'Left/Right view sequence type' indicating a stereoscopic 3D image or video composed of independent left and right image or video streams.

4. The method of claim 2, wherein a value of the attribute 'priorView' is set as 'LEFT_view' for a basic image or video for which a left image or video among the left and right images or videos constituting the stereoscopic 3D image or video should be first represented, and a value of the attribute 'priorView' is set as 'Right_view' for a basic image or video for which a right image or video among the left and right images or videos should be first represented.

5. The method of claim 2, wherein a value of the attribute 'stereoscopicMode' is set as one of 'ON' and 'true' when the stereoscopic 3D image or video is provided in a 3D image or video mode, and a value of the attribute 'stereoscopicMode' is set as one of 'OFF' and 'false' when the stereoscopic 3D image or video is provided in a normal image or video mode.

6. The method of claim 1, wherein the attribute 'stereoscopic' further indicates whether a media object used as a scene component of the LASeR content is a stereoscopic 3D image or video, when a value of the attribute 'stereoscopic' is 'true', it indicates that a media object used as a scene component of the LASeR content is a stereoscopic 3D image/video, and when a value of the attribute 'stereoscopic' is 'false', it indicates that a media object used as a scene component of the LASeR content is not a stereoscopic 3D image or video.

7. The method of claim 1, wherein the generating the LASeR content comprising:
when providing a different scene description according to whether the terminal supports stereoscopic 3D image or video and whether the user prefers 3D image or video, generating the LASeR content comprising one scene set with an attribute 'stereoscopicMode' set as 'true' and another scene set with the attribute 'stereoscopicMode' set as 'false'.

8. The method of claim 1, the event includes an event 'stereoscopicModeChanged' indicating the change in the 3D image or video support mode of the mobile terminal.

9. A method for providing stereoscopic three-dimensional (3D) image or video content in a mobile terminal based on Lightweight Application Scene Representation (LASeR), the method comprising:
receiving a LASeR content including therein stereoscopic 3D information and a corresponding stereoscopic 3D attribute or event;
decoding the received LASeR content according to the stereoscopic 3D attribute or the event;
checking LASeR commands from the decoded LASeR content;
executing the LASeR commands;
parsing scene information including stereoscopic 3D information included in the decoded LASeR content;
determining whether a media object to be included in scene description comprises a stereoscopic 3D image or video according to the stereoscopic 3D information; and
when the media object to be included in scene description comprises a stereoscopic 3D image or video, displaying the stereoscopic 3D image or video according to whether the mobile terminal supports a stereoscopic 3D image or video,
wherein the stereoscopic 3D attribute comprises an attribute 'stereoscopic' for indicating an instruction to check if the receiving terminal is capable of processing a stereoscopic 3D image or video.

10. The method of claim 9, wherein the stereoscopic 3D attribute further comprises at least one of an attribute 'compositionType' for indicating a stereoscopic 3D image or video composition type that indicates how the stereoscopic 3D image or video is composed, an attribute 'priorView' for indicating a basic image or video that should be first represented among left and right images or videos constituting the stereoscopic 3D image or video, an attribute 'stereoscopicMode' for indicating how the stereoscopic 3D image or video will be provided, and an attribute 'stereoscopicModeChanged' for indicating a change in the 3D image or video mode.

11. The method of claim 10, wherein the attribute 'compositionType' comprises at least one of 'side-by-side type' indicating a stereoscopic 3D image or video composed of one video stream where left and right images or videos are contained together in one frame, 'vertical line interleaved type' indicating a stereoscopic 3D image or video composed of one video stream where left and right images or videos are contained in one frame line by line in an interleaving manner, 'frame sequential type' indicating a stereoscopic 3D image or video composed of one video stream where left and right image or video frames alternately appear, and 'Left/Right view sequence type' indicating a stereoscopic 3D image or video composed of independent left and right image or video streams.

12. The method of claim 10, wherein a value of the attribute 'priorView' is set as 'LEFT_view' for a basic image or video for which a left image or video among the left and right images or videos constituting the stereoscopic 3D image or video should be first represented, and a value of the attribute 'priorView' is set as 'Right_view' for a basic image or video for which a right image or video among the left and right images or videos should be first represented.

13. The method of claim 10, wherein a value of the attribute 'stereoscopicMode' is set as one of 'ON' and 'true' when the stereoscopic 3D image or video is provided in a 3D image or video mode, and a value of the attribute 'stereoscopicMode' is set as one of 'OFF' and 'false' when the stereoscopic 3D image or video is provided in a normal image or video mode.

14. The method of claim 10, further comprising:
when an event occurs in which a 3D image or video support mode of the mobile terminal is changed, generating an event 'stereoscopicModeChanged' indicating the change in the 3D image or video support mode of the mobile terminal.

15. The method of claim 9, wherein the attribute 'stereoscopic' further indicates whether a media object used as a scene component of the LASeR content is a stereoscopic 3D image or video and wherein the determining comprises:
when the stereoscopic 3D attribute comprises 'stereoscopic' and a value of 'stereoscopic' is 'true', determining that a media object used as a scene component of the LASeR content is a stereoscopic 3D image or video; and
when the stereoscopic 3D attribute comprises 'stereoscopic' and a value of 'stereoscopic' is 'false', determining that a media object used as a scene component of the LASeR content is not a stereoscopic 3D image or video.

16. The method of claim 9, wherein when providing a different scene description according to whether the terminal supports stereoscopic 3D image or video and whether the user prefers 3D image or video, the LASeR content comprises one scene set with an attribute 'stereoscopicMode' set as 'true' and another scene set with the attribute 'stereoscopicMode' set as 'false'.

17. An apparatus for providing stereoscopic three-dimensional (3D) content based on Lightweight Application Scene Representation (LASeR) in a transmitter of a communication network, the apparatus comprising:

a LASeR content generator for generating a stereoscopic 3D attribute in accordance with attribute protocols of LASeR and for generating a LASeR content including therein stereoscopic 3D information according to the stereoscopic 3D attribute or event;
a LASeR encoder for LASeR-encoding the generated LASeR content; and
a LASeR content transmitter for transmitting the encoded LASeR content to a mobile terminal configured to display LASeR content,
wherein the stereoscopic 3D attribute comprises an attribute 'stereoscopic' for indicating an instruction to check if the receiving terminal is capable of processing a stereoscopic 3D image or video.

18. The apparatus of claim 17, wherein the stereoscopic 3D attribute further comprises at least one of an attribute 'compositionType' for indicating a stereoscopic 3D image or video composition type that indicates how the stereoscopic 3D image or video is composed, an attribute 'priorView' for indicating a basic image or video that should be first represented among left and right images or videos constituting the stereoscopic 3D image or video, an attribute 'stereoscopicMode' for indicating how the stereoscopic 3D image or video will be provided, and an attribute 'stereoscopicModeChanged' for indicating a change in the 3D image or video mode.

19. The apparatus of claim 18, wherein the attribute 'compositionType' comprises at least one of 'side-by-side type' indicating a stereoscopic 3D image or video composed of one video stream where left and right images or videos are contained together in one frame, 'vertical line interleaved type' indicating a stereoscopic 3D image or video composed of one video stream where left and right images or videos are contained in one frame line by line in an interleaving manner, 'frame sequential type' indicating a stereoscopic 3D image or video composed of one video stream where left and right image or video frames alternately appear, and 'Left/Right view sequence type' indicating a stereoscopic 3D image or video composed of independent left and right image or video streams.

20. The apparatus of claim 18, wherein a value of the attribute 'priorView' is set as 'LEFT_view' for a basic image or video for which a left image or video among the left and right images or videos constituting the stereoscopic 3D image or video should be first represented, and a value of the attribute 'priorView' is set as 'Right_view' for a basic image or video for which a right image or video among the left and right images or videos should be first represented.

21. The apparatus of claim 18, wherein an attribute value of the 'stereoscopicMode' is set as one of 'ON' and 'true' when the stereoscopic 3D image or video is provided in a 3D image or video mode, and an attribute value of the 'stereoscopicMode' is set as one of 'OFF' and 'false' when the stereoscopic 3D image or video is provided in a normal image or video mode.

22. The apparatus of claim 17, wherein the attribute 'stereoscopic' further indicates whether a media object used as a scene component of the LASeR content is a stereoscopic 3D image or video, when a value of the attribute 'stereoscopic' is 'true', it indicates that a media object used as a scene component of the LASeR content is a stereoscopic 3D image or video, and when a value of the attribute 'stereoscopic' is 'false', it indicates that a media object used as a scene component of the LASeR content is not a stereoscopic 3D image or video.

23. The apparatus of claim 17, wherein when providing a different scene description according to whether the terminal supports stereoscopic 3D image or video and whether the user prefers 3D image or video, the LASeR content generator generates the LASeR content comprising one scene set with an attribute 'stereoscopicMode' set as 'true' and another scene set with the attribute 'stereoscopicMode' set as 'false'.

24. The apparatus of claim 17, the event includes an event 'stereoscopicModeChanged' indicating the change in the 3D image or video support mode of the mobile terminal.

25. An apparatus for providing stereoscopic three-dimensional (3D) content in a mobile terminal based on Lightweight Application Scene Representation (LASeR), the apparatus comprising:
an Audio or Video (AV) processor for processing stereoscopic 3D data;
a LASeR decoder for decoding LASeR data comprising stereoscopic 3D information and a stereoscopic 3D attribute in accordance with attribute protocols of LASeR or event;
a LASeR scene tree manager for checking the stereoscopic 3D information from the decoded LASeR data according to the stereoscopic 3D attribute or the event, and for controlling scene description for describing a LASeR scene according to the stereoscopic 3D information;
a LASeR renderer for generating LASeR data according to LASeR scene description information provided from the LASeR scene tree manager; and
a display for displaying the stereoscopic 3D data provided from the AV processor, as a part of the LASeR scene that the LASeR renderer renders according to the LASeR scene description information,
wherein the stereoscopic 3D attribute comprises an attribute 'stereoscopic' for indicating an instruction to check if the receiving terminal is capable of processing a stereoscopic 3D image or video.

26. The apparatus of claim 25, wherein the stereoscopic 3D attribute further comprises at least one of an attribute 'compositionType' for indicating a stereoscopic 3D image or video composition type that indicates how the stereoscopic 3D image or video is composed, an attribute 'priorView' for indicating a basic image or video that should be first represented among left and right images or videos constituting the stereoscopic 3D image or video, an attribute 'stereoscopicMode' for indicating how the stereoscopic 3D image or video will be provided, and an attribute 'stereoscopicModeChanged' for indicating a change in the 3D image or video mode.

27. The apparatus of claim 26, wherein the attribute 'compositionType' comprises at least one of 'side-by-side type' indicating a stereoscopic 3D image or video composed of one video stream where left and right images or videos are contained together in one frame, 'vertical line interleaved type' indicating a stereoscopic 3D image or video composed of one video stream where left and right images or videos are contained in one frame line by line in an interleaving manner, 'frame sequential type' indicating a stereoscopic 3D image or video composed of one video stream where left and right image or video frames alternately appear, and 'Left/Right view sequence type' indicating a stereoscopic 3D image or video composed of independent left and right image or video streams.

28. The apparatus of claim 26, wherein a value of the attribute 'priorView' is set as 'LEFT_view' for a basic image or video for which a left image or video among the left and right images or videos constituting the stereoscopic 3D image or video should be first represented, and a value of the attribute 'priorView' is set as 'Right_view' for a basic image or video for which a right image or video among the left and right images or videos should be first represented.

29. The apparatus of claim 26, wherein a value of the attribute 'stereoscopicMode' is set as one of 'ON' and 'true' when the stereoscopic 3D image or video is provided in a 3D image or video mode, and a value of the attribute 'stereoscopicMode' is set as one of 'OFF' and 'false' when the stereoscopic 3D image or video is provided in a normal image or video mode.

30. The apparatus of claim 26, wherein when an event occurs in which a 3D image or video support mode of the mobile terminal is changed, the LASeR scene tree manager generates an event 'stereoscopicModeChanged' indicating the change in the 3D image or video support mode of the mobile terminal.

31. The apparatus of claim 25, wherein the attribute 'stereoscopic' further indicates whether a media object used as a scene component of the LASeR content is a stereoscopic 3D image or video and wherein when the stereoscopic 3D attribute comprises 'stereoscopic' and a value of the attribute 'stereoscopic' is 'true', the LASeR scene tree manager determines that a media object used as a scene component of the LASeR content is a stereoscopic 3D image or video and when the stereoscopic 3D attribute comprises 'stereoscopic' and a value of the attribute 'stereoscopic' is 'false', the LASeR scene tree manager determines that a media object used as a scene component of the LASeR content is not a stereoscopic 3D image or video.

32. The apparatus of claim 25, wherein when providing a different scene description according to whether the terminal supports stereoscopic 3D image or video and whether the user prefers 3D image or video, the LASeR content comprises one scene set with an attribute 'stereoscopicMode' set as 'true' and another scene set with the attribute 'stereoscopicMode' set as 'false'.

* * * * *